(12) United States Patent
Yu

(10) Patent No.: US 12,527,578 B1
(45) Date of Patent: Jan. 20, 2026

(54) SELF-LOCKING TOURNIQUET

(71) Applicant: Jiale Yu, Guangzhou (CN)

(72) Inventor: Jiale Yu, Guangzhou (CN)

( * ) Notice: Subject to any disclaimer, the term of this patent is extended or adjusted under 35 U.S.C. 154(b) by 0 days.

(21) Appl. No.: 19/180,391

(22) Filed: Apr. 16, 2025

(51) Int. Cl.
*A61B 17/132* (2006.01)
*A61B 17/12* (2006.01)

(52) U.S. Cl.
CPC *A61B 17/1322* (2013.01); *A61B 2017/12004* (2013.01)

(58) Field of Classification Search
CPC .............. A61B 17/132; A61B 17/1322; A61B 2017/12004
See application file for complete search history.

(56) References Cited

U.S. PATENT DOCUMENTS

| | | | |
|---|---|---|---|
| 7,776,064 B2 * | 8/2010 | Jennifer ............. | A61B 17/1322 602/5 |
| 8,303,620 B2 * | 11/2012 | Johnson ............. | A61B 17/1322 602/5 |
| 10,716,577 B2 * | 7/2020 | Kosiorek ........... | A61B 17/1327 |
| 11,224,441 B2 * | 1/2022 | Johnson ............. | A61B 17/1322 |
| 11,826,053 B2 * | 11/2023 | Johnson ................ | A44B 11/18 |
| 11,937,829 B2 * | 3/2024 | Johnson ............... | A61B 17/132 |
| 12,042,154 B2 * | 7/2024 | Johnson ............. | A61B 17/1327 |
| D1,085,414 S * | 7/2025 | Yu ................. | D24/143 |
| 2005/0240217 A1* | 10/2005 | Jennifer ............. | A61B 17/1322 606/203 |
| 2011/0178546 A1* | 7/2011 | Johnson ............. | A61B 17/1322 606/203 |
| 2011/0307004 A1* | 12/2011 | Johnson ............. | A61B 17/1322 606/203 |
| 2018/0193033 A1* | 7/2018 | Kosiorek ........... | A61B 17/1322 |
| 2020/0015828 A1* | 1/2020 | Johnson ................ | A44B 11/006 |
| 2020/0288820 A1* | 9/2020 | Johnson ............. | A61B 17/1327 |
| 2022/0218359 A1* | 7/2022 | Johhnson ........... | A61B 17/1327 |
| 2023/0057363 A1* | 2/2023 | Johnson ............. | A61B 17/1322 |
| 2024/0374264 A1* | 11/2024 | Johson ............... | A61B 17/1327 |

* cited by examiner

*Primary Examiner* — Ryan J. Severson
(74) *Attorney, Agent, or Firm* — JEEN IP LAW, LLC

(57) ABSTRACT

The disclosure relates to a self-locking tourniquet, including a base strap, a binding strap, a buckle frame and a tightening component, where the binding strap is attached to one end of the base strap, the buckle frame is connected to the other end of the base strap, the buckle frame is provided with a buckle hole in a through-type, the binding strap is fixedly connected with a self-adhesive, the self-adhesive extends longitudinally along the binding strap; the tightening component includes a tightening belt, a tightening handle and a stop ring, where one end of the tightening belt is fixedly connected with the binding strap, and the other end of the tightening belt is fixedly connected with the base strap; the tightening handle is provided with a tightening hole in a through-type; and the tightening belt passes through the tightening hole, and the stop ring is connected to the base strap.

9 Claims, 6 Drawing Sheets

SELF-LOCKING TOURNIQUET

TECHNICAL FIELD

The disclosure relates to the technical field of tourniquets, and in particular to a self-locking tourniquet.

BACKGROUND

Whether on the battlefield or in civilian settings, uncontrolled bleeding caused by trauma remains a leading cause of death. Untreated severe hemorrhage (such as arterial bleeding) can induce hypovolemic shock within minutes. The tourniquet is a well-known device used to prevent traumatic blood loss.

Existing tourniquets include a base strap, a binding strap, and a buckle frame. The binding strap is attached to one end of the base strap, while the buckle frame is connected to the other end of the base strap. The buckle frame is provided with a through-going buckle hole. The binding strap is fixedly connected with a self-adhesive strap, and extends along the length of the binding strap and is attached to the base strap. When using the tourniquet for hemostasis, the binding strap is threaded through the buckle hole, forming a loop with the base strap that encircles the limb or site requiring compression. The strap is then tightened to achieve hemostasis, while the self-adhesive strip adheres to itself to secure the binding strap in place, ensuring stable fixation and effective bleeding control.

In the aforementioned technique, relying solely on the binding strap for tightening to achieve hemostasis presents a limitation: when the strap is tightened to a certain degree, a significantly greater pulling force is required for further tightening. This makes it difficult to secure the tourniquet to the necessary compression level for effective bleeding control, ultimately resulting in suboptimal hemostatic performance.

SUMMARY

To facilitate easier tightening of the tourniquet to the required hemostatic tightening level, this application proposes a self-locking tourniquet, the disclosure provides a self-locking tourniquet.

The self-locking tourniquet provided by the disclosure adopts the following technical scheme:

the self-locking tourniquet includes a base strap, a binding strap, a buckle frame and a tightening component, where the binding strap is attached to one end of the base strap, the buckle frame is connected to the other end of the base strap, the buckle frame is provided with a buckle hole in a through-type, the binding strap is fixedly connected with a self-adhesive, the self-adhesive extends longitudinally along the binding strap; the tightening component includes a tightening belt, a tightening handle and a stop ring, where one end of the tightening belt is fixedly connected with the binding strap, and the other end of the tightening belt is fixedly connected with the base strap; the tightening handle is provided with a tightening hole in a through-type; and the tightening belt passes through the tightening hole, and the stop ring is connected to the base strap.

By adopting the technical scheme, when a user has a wound requiring hemostasis with a tourniquet, the base strap is placed at the appropriate hemostatic position. The binding strap is inserted through the buckle hole of the buckle frame to form a loop with the base strap and the binding strap, thereby completing the encirclement of the hemostatic site. The binding strap is then tightened to gradually reduce the size of the loop formed by the binding strap and base strap until initial tightening of the hemostatic site is achieved. The self-adhesive is then folded around the buckle frame in a mutually approaching direction and adhered for fixation; subsequently, the tightening strap is wound and tightened by rotating the tightening handle, thereby further reducing the loop formed by the winding strap and the base strap until complete hemostatic binding of the wound site is achieved. The tightening handle is then inserted through and engaged with the stop ring to secure the tightening handle in place, ensuring that the tourniquet remains tightened and maintains hemostasis at the wound site. Thus, the following situation is improved: when hemostasis relies solely on tightening the binding strap, a greater pulling force is required to further tighten the binding strap once it reaches a certain level of tightness, making it difficult to achieve the desired level of tightness for effective hemostasis, thereby leading to suboptimal hemostatic results.

Optionally, stop rods are fixedly arranged at both ends of the tightening handle, and when the tightening handle passes through the stop ring, the stop rods pass through the stop ring and are engaged with the stop ring.

Optionally, the stop ring is provided with a stop hole, the stop hole is communicated with the inside of the stop ring.

Optionally, the stop ring is triangular in shape, and the stop hole is located at one corner of the stop ring.

Optionally, the stop ring is located near one end of the binding strap.

Optionally, a plurality of friction rings are respectively arranged at both ends of the tightening handle, and each friction ring is uniformly distributed along the length of the tightening handle.

Optionally, the buckle frame is in an H-type window-frame configuration, and one side of the buckle frame extending along the length direction of the base strap is arc-shaped.

Optionally, both sides of the base strap are fixedly connected with adhesive tapes, and the base strap is connected with time stickers, the time stickers are used for recording the tightening time of the tourniquet, and when the time stickers are fixedly connected with the base strap, the time stickers are adhered to the adhesive tapes.

Optionally, the buckle frame, the tightening handle and the stop ring are made of metal.

To sum up, the disclosure includes at least one of the following beneficial technical effects:

When a user has a wound requiring hemostasis with a tourniquet, the base strap is placed at the appropriate hemostatic position. The binding strap is inserted through the buckle hole of the buckle frame to form a loop with the base strap and the binding strap, thereby completing the encirclement of the hemostatic site. The binding strap is then tightened to gradually reduce the size of the loop formed by the binding strap and base strap until initial tightening of the hemostatic site is achieved. The self-adhesive is then folded around the buckle frame in a mutually approaching direction and adhered for fixation; subsequently, the tightening strap is wound and tightened by rotating the tightening handle, thereby further reducing the loop formed by the winding strap and the base strap until complete hemostatic binding of the wound site is achieved. The tightening handle is then inserted through and engaged with the stop ring to secure the tightening handle in place, ensuring that the tourniquet remains tightened and maintains hemostasis at the wound site. Thus, the following situation is improved: when hemostasis relies solely on tightening the binding strap, a greater pulling force is required to further tighten the binding strap once it reaches a certain level of tightness, making it difficult to achieve the desired level of tightness for effective hemostasis, thereby leading to suboptimal hemostatic results.

Figure 1:
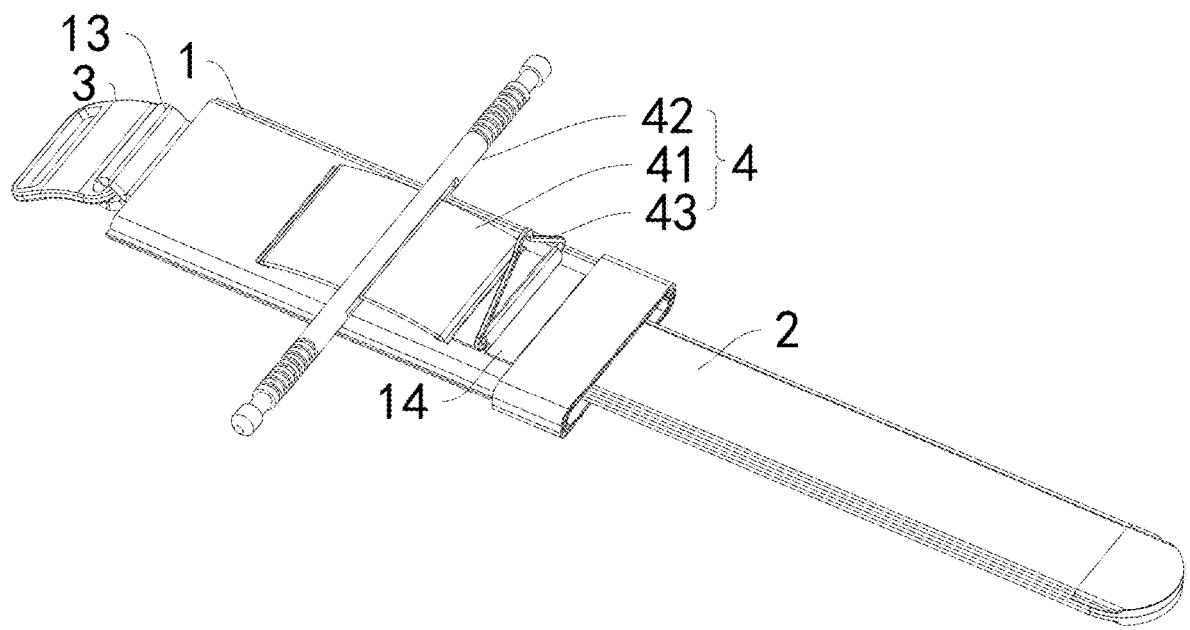
FIG. 1 is an overall structural schematic diagram of according to an embodiment of the present disclosure.

Descriptions of reference numerals: 1. base strap; 11. first belt body; 111. tightening groove; 12. second belt body; 13. buckle connecting belt; 14. stop strap; 15. adhesive tape; 16. time sticker; 2. binding strap; 21. self-adhesive; 3. buckle frame; 31. connecting hole 32. buckle hole; 4. tightening component; 41. tightening belt; 42. tightening handle; 421. tightening hole; 422. friction ring; 423. stop rod; 43. stop ring; and 431. stop hole.

DETAILED DESCRIPTION OF THE EMBODIMENTS

The present disclosure is further described in detail with reference to FIGS. 1-6.

The embodiment of the disclosure discloses a self-locking tourniquet. Referring to FIG. 1, a self-locking tourniquet includes a base strap 1, a binding strap 2, a buckle frame 3 and a tightening component 4.

Figure 2:
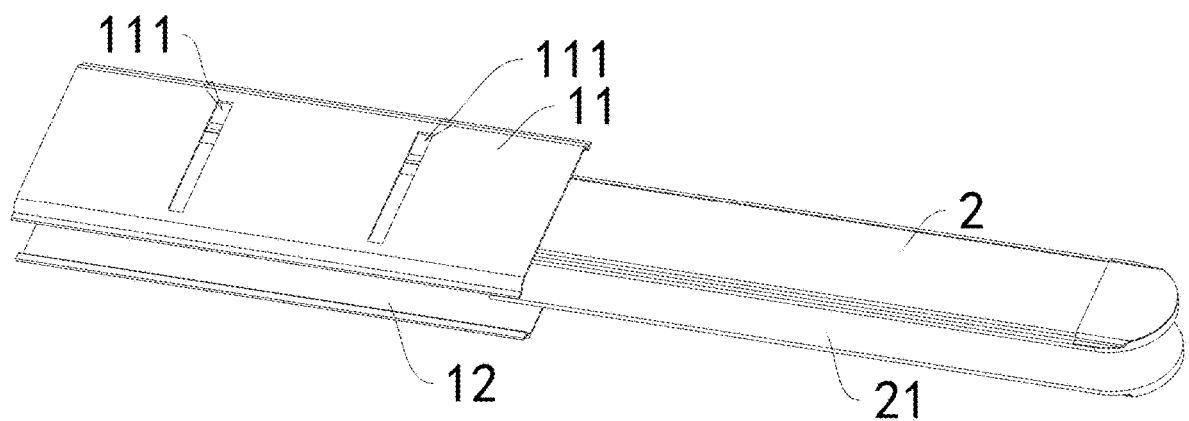
FIG. 2 is a structural schematic diagram of a base strap according to an embodiment of the present disclosure.

Referring to FIG. 1 and FIG. 2, the base strap 1 includes a first belt body 11 and a second belt body 12, the first belt body 11 and the second belt body 12 are sewn and fixed. The binding strap 2 is attached to one end of the base strap 1 and located between the first belt body 11 and the second belt body 12. A self-adhesive 21 is sewn and fixed on one side of the binding strap 2, and the self-adhesive 21 extends longitudinally along the binding strap 2.

Figure 3:
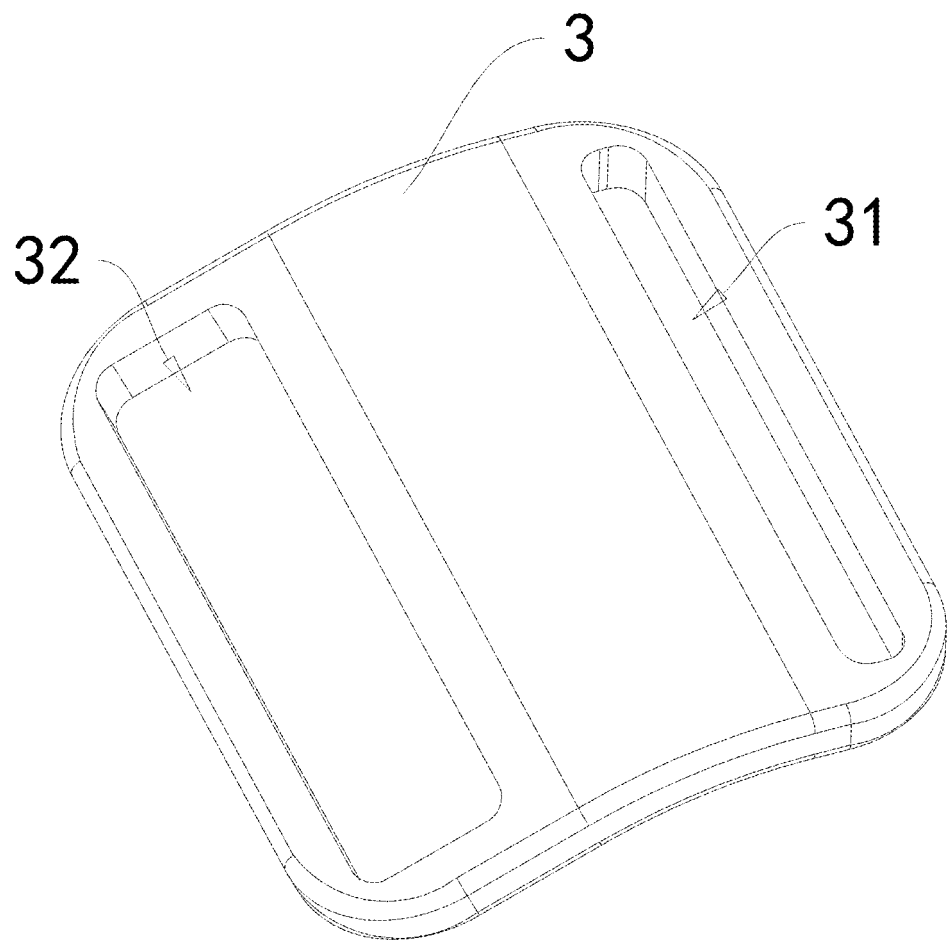
FIG. 3 is a structural schematic diagram of a buckle frame according to an embodiment of the present disclosure.

Referring to FIG. 1 and FIG. 3, the other end of the base strap 1 is connected with a buckle connecting belt 13, one end of the buckle connecting belt 13 is sewn and fixed with the first belt body 11, and the other end of the buckle connecting belt 13 is sewn and fixed with the second belt body 12. The buckle frame 3 is provided with a connecting hole 31 in a through-type, and the buckle connecting belt 13 penetrates through the connecting hole 31, thereby connecting the buckle frame 3 to the other end of the base strap 1, and the buckle frame 3 is in an H-type window-frame configuration.

Referring to FIG. 1 and FIG. 2, the tightening component 4 includes a tightening belt 41, one end of the tightening belt 41 is located between the binding strap 2 and the self-adhesive 21, and the tightening belt 41 is sewn and fixed with the binding strap 2, and the other end of the tightening belt 41 is located between the first belt body 11 and the second belt body 12, and the tightening belt 41 is sewn and fixed with the base strap 1. The first belt body 11 is provided with two tightening grooves 111 in a through-type, and the tightening belt 41 penetrates through the two tightening grooves 111 at the same time, thereby positioning the middle part of the tightening belt 41 on the surface of the first belt body 11.

Figure 4:
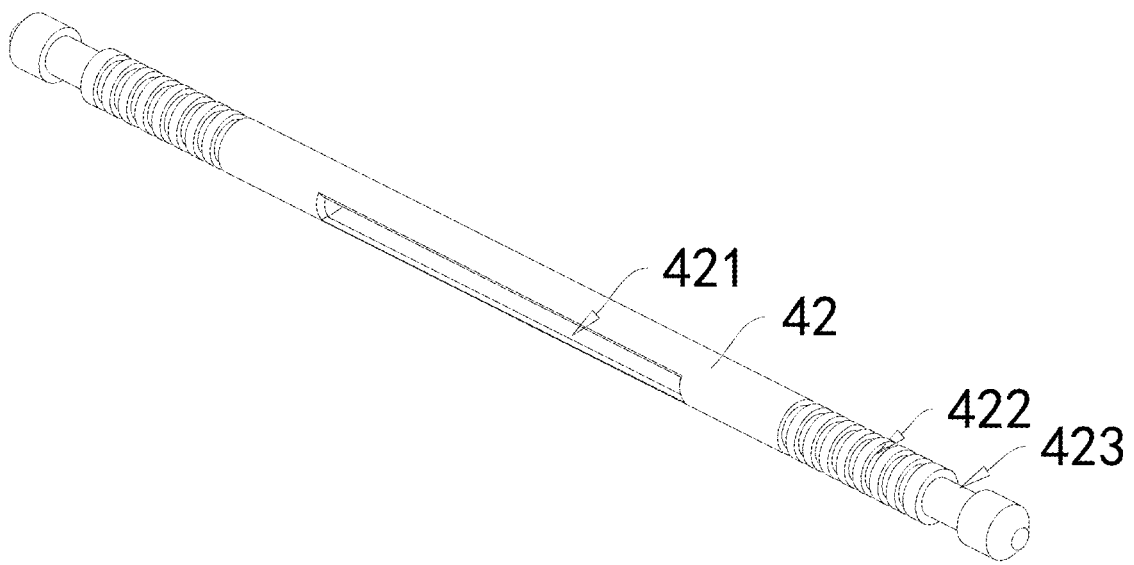
FIG. 4 is a structural schematic diagram of a tightening handle according to an embodiment of the present disclosure.

Referring to FIG. 1 and FIG. 4, the tightening component 4 further includes a tightening handle 42, the tightening handle 42 is provided with a tightening hole 421 in a through-type, the middle of the tightening belt 41 is penetrated through the tightening hole 421, and a plurality of friction rings 422 are respectively arranged at both ends of the tightening handle 42, and each friction ring 422 is evenly distributed along the length direction of the tightening handle 42, so that when the tightening handle 42 is grasped and rotated, the friction resistance between the palm and the tightening handle 42 is greater, thereby making it easier to grasp and rotate the tightening handle 42. In the embodiments of this disclosure, the material selected for the tightening handle 42 is metal.

Figure 5:
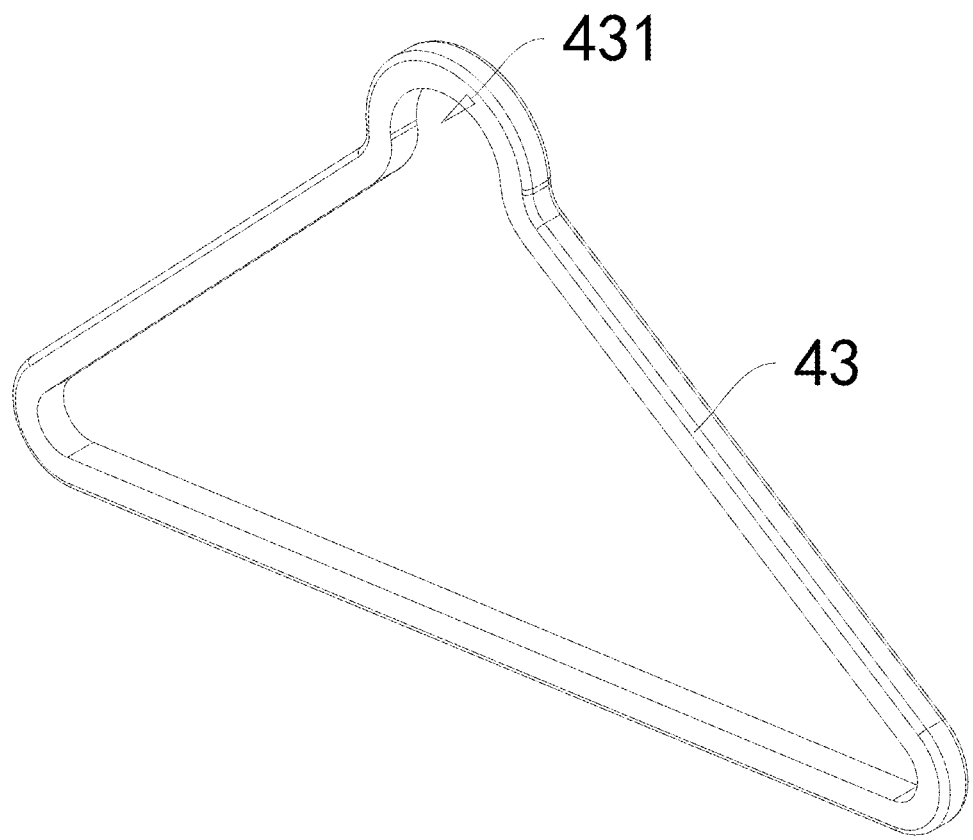
FIG. 5 is a structural schematic diagram of a stop ring according to an embodiment of the present disclosure.

Refer to FIG. 1 and FIG. 5, the tightening component 4 further includes a stop ring 43, one end of the first belt body 11 close to the binding strap 2 is connected with a stop strap 14, both end of the stop strap 14 are sewn and fixed with the first belt body 11, the middle part of the stop strap 14 passes through the stop ring 43, so that the stop ring 43 is connected to the surface of the first belt body 11 close to one end of the binding strap 2, the shape of the stop ring 43 is triangular, and a stop hole 431 is arranged at the top corner of the stop ring 43. The stop hole 431 communicates with the inside of the stop ring 43, and both ends of the tightening handle 42 are fixedly provided with stop rods 423. When the tightening handle 42 passes through the stop ring 43, the stop rods 423 pass through the stop hole 431 and engage with the stop hole 431, thereby enhancing the stability of the snap-fit connection between the stop ring 43 and the tightening handle 42. In the embodiments of the disclosure, the material selected for the stop ring 43 is metal.

Figure 6:
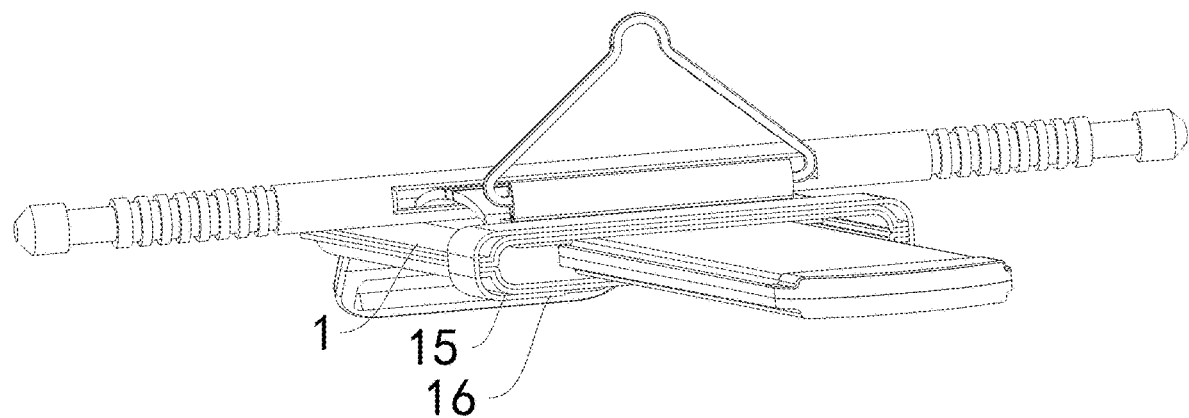
FIG. 6 is a structural schematic diagram of a time sticker according to an embodiment of the disclosure.

Referring to FIG. 1 and FIG. 6, the first belt body 11 and the second belt body 12 are both fixedly connected with an adhesive tape 15, and the base strap 1 is connected with a time sticker 16, the time sticker 16 is used to record the tightening time of the tourniquet, so as to conveniently determine the time when the tourniquet needs to be loosened. When the time sticker 16 is fixedly connected to the base strap 1, the time sticker 16 is adhered to the adhesive tape 15.

An implementation principle of the self-locking tourniquet in the embodiment of the disclosure is as follows: when a user has a wound requiring hemostasis with a tourniquet, the base strap 1 is placed at the appropriate hemostatic position, the binding strap 2 is inserted through the buckle hole 32 of the buckle frame 3 to form a loop with the base strap 1 and the binding strap 2, thereby completing the encirclement of the hemostatic site, the binding strap 2 is then tightened to gradually reduce the size of the loop formed by the binding strap 2 and base strap 1 until initial tightening of the hemostatic site is achieved; the self-adhesive 21 is then folded around the buckle frame 3 in a mutually approaching direction and adhered for fixation; and a part of the self-adhesive 21 extends to the base strap 1, and is adhered and fixed with the adhesive tape 15 sewn and fixed on one side of the base strap 1, then the time sticker 16 is adhered and fixed with the adhesive tape 15, and the binding strap 2 adhered and fixed with the adhesive tape 15 through the self-adhesive 21 is wrapped, so that the binding strap 2 is fixed again. At the same time, when the tourniquet needs to be unbound and fixed, the time sticker 16 needs to be removed first, so that the user can not easily ignore the binding time recorded by the time sticker 16;

After the binding strap 2 is fixed, the tightening strap 41 is wound and tightened by rotating the tightening handle 42, thereby further reducing the loop formed by the winding strap 2 and the base strap 1 until complete hemostatic binding of the wound site is achieved. The tightening handle 42 is then inserted through and engaged with the stop ring 43 to secure the tightening handle 42 in place, ensuring that the tourniquet remains tightened and maintains hemostasis at the wound site, thus, the following situation is improved: when hemostasis relies solely on tightening the binding strap 2, a greater pulling force is required to further tighten the binding strap 2 once it reaches a certain level of tightness, making it difficult to achieve the desired level of tightness for effective hemostasis, thereby leading to suboptimal hemostatic results.

The above are the preferred embodiments of the disclosure, and do not limit the protection scope of this disclosure accordingly. Therefore, all equivalent changes made according to the structure, shape and principle of this disclosure should be included in the protection scope of the disclosure.

What is claimed is:

1. A self-locking tourniquet, comprising a base strap (1), a binding strap (2), a buckle frame (3) and a tightening component (4), wherein the binding strap (2) is attached to one end of the base strap (1), the buckle frame (3) is connected to the other end of the base strap (1), the buckle frame (3) is provided with a buckle hole (32) in a through-type, the binding strap (2) is fixedly connected with a self-adhesive (21), the self-adhesive (21) extends longitudinally along the binding strap (2); the tightening component (4) comprises a tightening belt (41), a tightening handle (42) and a stop ring (43), wherein one end of the tightening belt (41) is fixedly connected with the binding strap (2), and the other end of the tightening belt (41) is fixedly connected with the base strap (1); the tightening handle (42) is provided with a tightening hole (421) in a through-type; and the tightening belt (42) passes through the tightening hole (421), and the stop ring (43) is connected to the base strap (1).

2. The self-locking tourniquet according to claim 1, wherein stop rods (423) are fixedly arranged at both ends of the tightening handle (42), and when the tightening handle (42) passes through the stop ring (43), the stop rods (423) pass through the stop ring (43) and are engaged with the stop ring (43).

3. The self-locking tourniquet according to claim 2, wherein the stop ring (43) is provided with a stop hole (431), the stop hole (431) is communicated with the inside of the stop ring (43).

4. The self-locking tourniquet according to claim 3, wherein the stop ring (43) is triangular in shape, and the stop hole (431) is located at one corner of the stop ring (43).

5. The self-locking tourniquet according to claim 1, wherein the stop ring (43) is located near one end of the binding strap (2).

6. The self-locking tourniquet according to claim 1, wherein a plurality of friction rings (422) are respectively arranged at both ends of the tightening handle (42), and each friction ring (422) is uniformly distributed along the length of the tightening handle (42).

7. The self-locking tourniquet according to claim 1, wherein the buckle frame (3) is in an H-type window-frame configuration, and one side of the buckle frame (3) extending along the length direction of the base strap (1) is arc-shaped.

8. The self-locking tourniquet according to claim 1, wherein both sides of the base strap (1) are fixedly connected with adhesive tapes (15), and the base strap (1) is connected with time stickers (16), the time stickers (16) are used for recording the tightening time of the tourniquet, and when the time stickers (16) are fixedly connected with the base strap (1), the time stickers (16) are adhered to the adhesive tapes (15).

9. The self-locking tourniquet according to claim 1, wherein the buckle frame (41), the tightening handle (42) and the stop ring (43) are made of metal.

* * * * *